(12) United States Patent
Lutz et al.

(10) Patent No.: US 12,149,506 B2
(45) Date of Patent: *Nov. 19, 2024

(54) DATA ROUTING OPTIONS FOR A VPN

(71) Applicant: Connectify, Inc., Philadelphia, PA (US)

(72) Inventors: Brian Lutz, Philadelphia, PA (US); Kevin Cunningham, Swarthmore, PA (US); Alexander Gizis, Philadelphia, PA (US); Brian Prodoehl, Plymouth Meeting, PA (US)

(73) Assignee: Connectify, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,362

(22) Filed: Jul. 7, 2023

(65) Prior Publication Data

US 2023/0353541 A1 Nov. 2, 2023

Related U.S. Application Data

(63) Continuation of application No. 17/236,929, filed on Apr. 21, 2021, now Pat. No. 11,743,235.

(60) Provisional application No. 63/014,638, filed on Apr. 23, 2020.

(51) Int. Cl.
*H04L 9/40* (2022.01)
*H04L 12/46* (2006.01)
*H04L 45/00* (2022.01)

(52) U.S. Cl.
CPC ...... *H04L 63/0272* (2013.01); *H04L 12/4641* (2013.01); *H04L 45/72* (2013.01); *H04L 63/0236* (2013.01)

(58) Field of Classification Search
CPC ............. H04L 63/0272; H04L 63/0236; H04L 12/4641; H04L 45/72
See application file for complete search history.

(56) References Cited

U.S. PATENT DOCUMENTS

| 7,036,143 | B1 | 4/2006 | Leung et al. |
| 8,156,199 | B1 | 4/2012 | Hoche-Mong et al. |
| 8,910,239 | B2 * | 12/2014 | Barton ................. H04L 63/029 726/4 |
| 10,601,779 | B1 | 3/2020 | Matthews et al. |
| 10,841,168 | B2 | 11/2020 | Byrnes et al. |
| 11,190,480 | B2 | 11/2021 | Chand et al. |
| 11,362,987 | B2 | 6/2022 | Saidumuhamed et al. |
| 11,362,999 | B2 | 6/2022 | Rudnik |
| 2006/0031407 | A1 | 2/2006 | Dispensa et al. |
| 2013/0133061 | A1 | 5/2013 | Fainkichen et al. |

(Continued)

*Primary Examiner* — Blake J Rubin
(74) *Attorney, Agent, or Firm* — Kamran Emdadi

(57) ABSTRACT

One example method of operation may include determining whether a data request initiated by a client device to obtain data from a remote server should be forwarded by a virtual private network (VPN) server or outside of the VPN server, forwarding, via the client device, a data fetch outside of the virtual private network (VPN) server in communication with the client device, to obtain the data from the remote server, and the remote server is identified on a list identifying servers requiring non-VPN communications, receiving the data from the remote server, via the client device, outside of the VPN server, forwarding, via the client device, a request for additional data to the VPN server, and receiving the additional data from the VPN server at the client device.

20 Claims, 7 Drawing Sheets

(56) References Cited

U.S. PATENT DOCUMENTS

| | | | |
|---|---|---|---|
| 2014/0109175 A1 | 4/2014 | Barton et al. | |
| 2015/0188949 A1* | 7/2015 | Mahaffey | H04L 41/0894 726/1 |
| 2016/0261564 A1 | 9/2016 | Foxhoven et al. | |
| 2016/0294793 A1 | 10/2016 | Larson et al. | |
| 2017/0346811 A1 | 11/2017 | Newell et al. | |
| 2018/0041472 A1 | 2/2018 | Mower et al. | |
| 2018/0255060 A1 | 9/2018 | Bansal | |
| 2018/0309658 A1* | 10/2018 | Parla | H04L 45/54 |
| 2019/0132291 A1 | 5/2019 | Zhao et al. | |
| 2019/0173849 A1 | 6/2019 | Lapidous et al. | |
| 2019/0238504 A1 | 8/2019 | Gupta et al. | |
| 2019/0327205 A1* | 10/2019 | Saidumuhamed | H04L 12/4633 |
| 2019/0334864 A1* | 10/2019 | Yin | H04L 63/0272 |
| 2019/0372937 A1* | 12/2019 | Song | H04L 63/0227 |
| 2020/0228498 A1 | 7/2020 | Yang et al. | |
| 2020/0259795 A1 | 8/2020 | Koshal et al. | |
| 2020/0304459 A1* | 9/2020 | Konda, Jr. | H04L 63/126 |
| 2021/0021564 A1 | 1/2021 | Chand et al. | |
| 2021/0021565 A1 | 1/2021 | Chand et al. | |
| 2021/0273913 A1 | 9/2021 | Bosch et al. | |
| 2021/0320871 A1* | 10/2021 | Savarese | H04L 47/20 |
| 2022/0086121 A1 | 3/2022 | Chand et al. | |
| 2022/0103515 A1 | 3/2022 | Yin et al. | |
| 2023/0108854 A1 | 4/2023 | Namdev et al. | |

\* cited by examiner

DATA ROUTING OPTIONS FOR A VPN

FIELD OF THE INVENTION

The present invention relates to data streaming, and in particular to data streaming in combination with the use of a virtual private network (VPN). Specifically, permitting data streaming to occur with or without a VPN.

BACKGROUND OF THE INVENTION

Computers can communicate with one another only when connected together using some form of a communications network. The Internet is one such network, which has grown extensively over the past decade, and has the distinct advantage of being able to connect computers together from anywhere in the world. Another type of communications network is a local area network ("LAN"), which exist as private networks that typically include between only a few trusted computers, usually in an office or home. A further example of a computer communications network is a wide area network ("WAN"), which is usually used as a means of communications access to the Internet via a wireless radio protocol.

There are many possible reasons to want remote computers to join a LAN. A LAN itself is often secure, it may contain or have access to important corporate resources at the office, or access to one's personal media or data files in a residential setting. However, once a user attaches to a LAN via a direct Internet connection, the LAN is no longer secure. For this reason, the Virtual Private Network ("VPN") was created. The VPN may include software that appears to be another LAN adapter, but uses encryption technology certain methods, and Internet connections, to bridge remote computers onto a local area network, without risk of directly connecting the LAN to the public and the insecure Internet.

FIG. 1 illustrates a prior art classic Virtual Private Network 100. In such a network, predefined or rolling algorithms allow a secure connection between a computer 102 and a remote server 160. This connection is made over any network 140, which may also be the Internet, with security managed by the VPN layer on the VPN server 150. Any software applications 110 on the client computer 102 will identify the VPN layer as VPN client 120, appearing no different than the driver 121 for a physical network interface. The VPN client 120 encapsulates 122 all traffic sent to it (in some cases as encrypted, private data), and then sends it via a standard network interface and driver to a physical network interface device, such as a Wi-Fi or Ethernet device. From there, the data may travel to Internet 140 via LAN 130 and ISP 135. A single ISP is shown handling both cellular access and a LAN, although this is merely exemplary. For example, respectively different ISPs may be used for cellular access and the LAN.

The VPN data may be secure over the Internet 114, using encryption. and is subsequently sent to VPN server 150. VPN server 150 may decapsulate (e.g., decrypt) via a module 152, the data received from the VPN client before sending the decrypted data to remote server 160. Remote server 160 may transmit a response to VPN server 150, which may be encrypted and sent to computer 102 (wherein that data is decrypted before being provided to the user).

A limitation of the typical VPN user is the network itself. Some client devices may have multiple Internet connections: WAN, LAN, Wi-Fi, etc. But each of these connections are not necessarily useful at all times, particularly over the course of a day for a traveler. For example, while a Wi-Fi connection may be the best communication means at one location, a WAN may be better for signal transmission at a different location. It may be complex to switch the VPN from interface to interface, and there is usually no way to take advantage of the speed of multiple interfaces when they are available.

There is a history for using multiple physical interfaces and treating them as a single faster interface. This has historically been called "network bonding." The use of a bonded set of slower physical interfaces to create one large, virtual interface is well documented.

Using either a network layer or a device layer abstraction, such a system splits network traffic in some agreed-upon way over multiple point-to-point connections, such as phone lines, to a service provider. That service provider contains a similar network layer or device layer, which can reassemble the traffic, delivering it to a standard network layer protocol, and ultimately, interfaced to the target network.

SUMMARY OF THE INVENTION

A method of controlling data transmission comprises receiving a request to retrieve data from one or another of a plurality of servers, evaluating an identifier included with the request; and routing the request inside or outside of a VPN based on an evaluation of the identifier. In one embodiment the process may include transferring data between a client and at least one of a plurality of servers, and encapsulating the data in a VPN as the data is transferred, providing a list of IP addresses, domain names, and/or SNI extensions, wherein the IP addresses, domain names, and/or SNI extensions which correspond to a known source of data; monitoring the data as said data is transferred between said server and said client, comparing a) IP addresses, domain names, and/or SNI extensions detected during the monitoring of said data with b) IP addresses, domain names and/or SNI extensions included in the list, and routing the request for the data and the subsequent response either inside the VPN or outside the VPN based on the comparing.

Another example embodiment may include a method that includes receiving a data request from a client device to retrieve data from one or more servers, identifying from the data request one or more of a domain name and an IP address associated with the one or more servers, determining whether the data will be routed through a VPN server or through a non-VPN route among the one or more servers based on a comparison of one or more of the domain name and the IP address with one or more lists stored in a VPN client application memory associated with the VPN server, and routing the data through the VPN server or outside the VPN server based on results of the comparison.

Still another example embodiment may include an apparatus that includes a receiver configured to receive a data request from a client device to retrieve data from one or more servers, and a processor configured to identify from the data request one or more of a domain name and an IP address associated with the one or more servers, determine whether the data will be routed through a VPN server or through a non-VPN route among the one or more servers based on a comparison of one or more of the domain name and the IP address with one or more lists stored in a VPN client application memory associated with the VPN server, and route the data through the VPN server or outside the VPN server based on results of the comparison.

Another example embodiment may include a non-transitory computer readable storage medium configured to store instructions that when executed cause a processor to perform receiving a data request from a client device to retrieve data from one or more servers, identifying from the data request one or more of a domain name and an IP address associated with the one or more servers, determining whether the data will be routed through a VPN server or through a non-VPN route among the one or more servers based on a comparison of one or more of the domain name and the IP address with one or more lists stored in a VPN client application memory associated with the VPN server, and routing the data through the VPN server or outside the VPN server based on results of the comparison.

Another example embodiment may include a process, device or non-transitory computer readable medium configured to perform determining whether a data request initiated by a client device to obtain data from a remote server should be forwarded by a virtual private network (VPN) server or outside of the VPN server, forwarding, via the client device, a data fetch outside of the virtual private network (VPN) server in communication with the client device, to obtain the data from the remote server, and the remote server is identified on a list identifying servers requiring non-VPN communications, receiving the data from the remote server, via the client device, outside of the VPN server, forwarding, via the client device, a request for additional data to the VPN server, and receiving the additional data from the VPN server at the client device.

DETAILED DESCRIPTION

Figure 2:
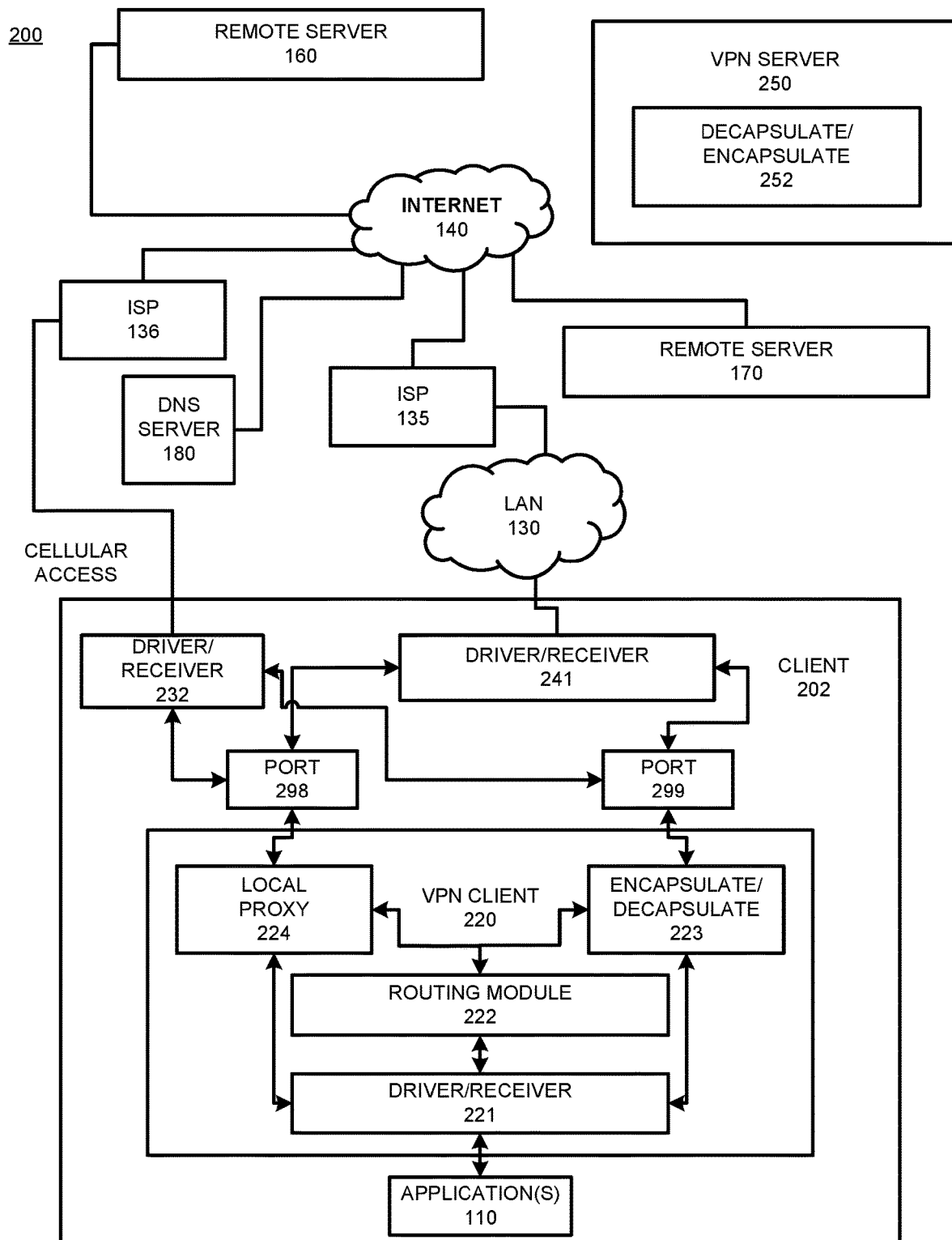
FIG. 2 is a block diagram that illustrates a VPN in accordance with an exemplary embodiment of the present invention.

FIG. 2 is a block diagram that illustrates communication system 200 in accordance with one or more exemplary embodiments of the present invention.

Generally speaking, communication system 200 includes client 202 and remote server 160. Client 202 may be, for example, a mobile communications device. Remote server 160 is a source of data that is desired by client 202. Remote server 160 may be any source of data. In one or more exemplary embodiments of the present invention, remote server 160 is a source of video streaming. Various video streaming providers that provide video streaming services are known including NETFLIX, HULU, etc. Thus, in one example, client 202 desires to receive video content from a video streaming provider.

The communication system further includes a virtual private network (VPN). In addition to client 202 communicating with remote server 160, client 202 also attempts to communicate with a source of data via a VPN. The VPN, for example, provides data encapsulation (which may or may not include data encryption). One exemplary use of a VPN is to provide secure, encrypted data. Thus, client 202 may attempt to communicate with remote server 160 as well as communicate over a VPN.

The above objective, to communicate with remote server 160 as well as to communicate over a VPN may take several forms. In one form, communication with remote server 160 is outside of the VPN, while further communication takes place with the VPN. The communication that takes place with the VPN may be with remote server 160 or with another remote server 170. In another example, communication with remote server 160 may be over a VPN while additional communication occurs with a VPN (the same VPN that is communicating with remote server 160 or different VPN). In the explanation set forth below, communication with remote server 160 is outside of a VPN while communication to remote server 160 or to an additional remote server 170 occurs with a VPN, but this is merely an example and other combinations of communication with remote servers with or without a VPN may be performed.

It is known that client 202 may transmit a request to remote server 160 (via Internet 140) so that remote server 160 responds by streaming data to client 202 (via Internet 140). In addition, client 202 may be using a VPN to communicate over a wide area network such as Internet 140. It is also known that if certain popular video streaming providers detect they are being requested to stream data from a VPN, they will automatically block the request. This is because some video streaming providers do not wish to transmit their streaming data over a VPN. The reason that providers may not wish to transmit their streaming data over a VPN is explained below.

Video streaming providers provide content (such as movies) on a regional basis. This is because video streaming providers may be licensed to stream content (e.g., movies) in one geographic region but may not be licensed to stream content in another geographic region. One way in which a video streaming provider determines the geographic region that has requested the streaming data is by looking at the IP address from the source that made the request. By looking at the IP address, the source of streaming video data can determine the geographic region from which the request for the streaming data originated. If (for example) a specific movie has geographic region licensing restrictions, the video streaming provider can determine whether it is licensed to stream that movie in the geographic region from which the request for the streaming data originated. Some users attempt to get around these licensing restrictions by using a VPN. When a user device uses a VPN to request streaming data, the IP address associated with the VPN is typically different than the IP address associated with the user that is requesting the streaming data. Also, VPN servers can be in many different countries (and with associated IP addresses). Thus, if video streaming provider is not licensed to provide the data to the user in the user's actual geographic region (as identified by the user's IP address), the user can try to reach the video streaming provider via a VPN server that is located in a geographic region that is authorized to receive the requested streaming data. In this manner, if successful, a user is able to "get around" the geographic licensing rules and violate the content provider policy.

Video streaming providers have become aware of this practice of getting around geographic licensing rules and attempt to prevent this practice from happening. The way that they prevent this practice from happening is by keeping a list (i.e., a deny list) of IP addresses associated with VPN servers. In this manner, if a video streaming provider receives a request to stream data from an IP address on the deny list, the video streaming provider simply refuses to stream data to that address.

Some VPN providers have attempted to get around these deny lists by constantly changing the IP addresses of their VPN servers. In other words, they change their IP addresses to an address that is not on the deny list. This is a very labor-intensive operation as it requires constant monitoring to determine whether a VPN server IP address has been newly placed on the deny list, and then changing the VPN server IP address to an IP address that is not on the deny list.

Accordingly, a method and apparatus are provided to allow data to be streamed from outside of the VPN so that the streaming data is not blocked. Concurrently, a VPN is available to provide for secure communication.

FIG. 2 illustrates a user communicating with the network via a VPN client. Initially, FIG. 2 illustrates that client 102 wishes to communicate with remote server 160. As shown, client 102 may be, for example, a mobile communications device that wirelessly communicates with network 135 via one or more access points (that may include ethernet, modem, cellular, Wi-Fi, etc.). ISP 135 and ISP 136 may each permit public access or restricted access. As an example, ISP 135 may include a communications network that is typically accessed over a wired connection (i.e., ISP), while ISP 136 may include a communications network that is accessed by cellular communications provider (i.e. cellular data service provider). Alternatively, or in addition, an ISP may be provided that allows both forms of communication and perhaps another form of communication. ISP 135 and ISP 136 are shown coupled to Internet 140 through communication protocols that are well known to one of ordinary skill in the art. In one example, ISP 135 and ISP 136 interface with Internet 140 via a fiber-optic or ethernet Internet connection.

While in one example ISP 136 is accessed by a cellular access point, ISP 136 may be accessed via other methods alternatively or as well, such as a LAN (e.g., a wireless home network), a combination of wired and/or wireless connections, and perhaps one or more intervening networks (such as a wide area network) so that access to Internet 140 may be obtained.

In the example above, a user may use client 202 for voice communication. Assume client 202 is a cell phone such as a smartphone, and communication occurs via a Voice over IP (VoIP) application. Client 202 communicates with ISP 135, ISP 136, or both (alternatively or simultaneously using technology such as channel bonding) via one or more access points and a digitized form of the user's voice is then transmitted to Internet 140. From Internet 140, the data that represents the user's voice is transmitted to remote server 170. From remote server 170, the data may be transmitted to another user (not shown) so that voice communication between the two users may occur.

In another embodiment, a user may use client 202 for secure voice communication. Data from application 110 enters VPN client 220 via driver/receiver 221. Voice communication data is encapsulated (which may or may not include encryption) via encapsulate/decapsulate (encap/decap) module 223. Encapsulated data is then transmitted to ISP 135 (and/or ISP 136) via one or more access points before reaching Internet 140. From Internet 140, the encapsulated data (i.e. the encapsulated voice communication data) is transmitted to VPN server 250. Data is then decapsulated (which may or may not include decryption) via decapsulate/encapsulate (decap/encap) module 252 before being retransmitted to Internet 140 and remote server 170. From remote server 170, the data may be transmitted to another user (not shown) so that voice communication between two users may occur via a VPN.

In another embodiment, client 202 streams video data from remote server 160. Client 202 requests the video data from remote server 160 by transmitting a request through ISP 135 (and/or ISP 136) and Internet 140. Remote server 160 responds to the request by transmitting video via Internet 140, and back to ISP 135 (and/or ISP 136), so that it is eventually received by client 202. Such video streaming occurs outside of a VPN. The request to stream data may or may not be proceeded by a DNS request to provide the IP address of remote server 160.

In yet another example, remote server 160 serves two purposes: first, it is used as the source of streaming data (inside or outside a VPN) and second, it is used in combination with data that has been transmitted via the VPN.

In another example, data is transmitted via a VPN, and further data is transmitted outside of the VPN (or outside of the VPN on another VPN). The data may be transmitted to at least two different servers (a remote server and a VPN server). Alternatively, the data transmitted via the VPN and outside of the VPN (or outside on another VPN) may be transmitted to the same server.

In the above description, when the phrase "outside of the VPN" is used, this may include non-encapsulated/unencrypted data (i.e. data not encapsulated/encrypted by a VPN) and/or encapsulated/encrypted data that has been encapsulated/encrypted by another VPN.

Turning back to FIG. 2, application(s) 110 participates in communications that include Internet 140. In particular, application(s) 110 participate in communications that include VPN client 220. At least one type of communication that includes VPN client 220 also includes encapsulation/encryption. At least another type of communication that includes VPN client 220 omits encapsulation/encryption (at least by VPN client 220).

First, a description is provided of communication that includes VPN client 220 and that omits encapsulation/encryption (at least by VPN client 220).

VPN client 220 includes driver (driver/receiver) 221 that receives data from one or more applications 110. Driver 221 may be, for example, a TUN/TAP driver.

A request for data (such as a request for data streaming) to be returned to application 110 (or the act of providing data) is transmitted from driver 221 and is received by routing module 222. The purpose of routing module 222 is to determine whether the request for data will be encapsulated (for purposes of being transmitted via the VPN) or whether the request for data will be transmitted to local proxy 224 and not encapsulated (at least within VPN client 220). In addition, when the request for data that is transmitted via the VPN arrives at its destination, the destination is advised that the source of the data was a VPN server (and not the actual source of the data) because the destination receives the IP address of the VPN server as the source; client 102/202 (the actual source of the data) may be hidden to the destination as the destination will only "see" the IP address associated with the VPN server. By contrast, when a request for data that is not transmitted via the VPN arrives at its destination, the destination "sees" that the source of the data was client 202.

Among other things, when the request for data (or data, itself) has been received by routing module 222 connected to switch 243, the request for data is evaluated in an attempt to determine whether the request for data should be transmitted outside of the VPN (i.e., not encapsulated by VPN client 220, not received at its destination that the source of the data is a VPN server, etc.). This determination may be performed by the use of a look-up table or list (i.e., the table indicates whether the destination of the data is such that the data should be transmitted inside or outside a VPN). In an exemplary embodiment of the present invention, routing module 222 may make this determination by looking at the domain name of the server targeted for the request for data. As an example, this determination may be made by looking at the domain name included in a DNS request. In a further exemplary embodiment, this determination may be made by looking at the IP address of the server targeted by the request for data (or data transmission), and whether that IP address corresponds to a domain name in the look-up table. While a domain name may be a basis for making this determination, other factors may be used in place of or in addition to the domain name to determine whether the request for data (or data transmission) should be transmitted outside of the VPN. Other exemplary methods for making this determination include evaluating a port (298/299) number, evaluating a host name in the server name identification (SNI) extension, etc.

For purposes of explanation, a data request (i.e. to stream video data) will be broken down into two separate requests (as an example). The first is a DNS request to a DNS server (to obtain the IP address associated with a Domain name of a server where requests for streaming data are serviced). The second is an IP request or the "data fetch" (in which the IP address obtained from the DNS request is used to request that a server provide data). In some situations, the first request is not performed because the IP address is already available for the data fetch. This situation may occur if the IP address associated with a domain name has been cached.

More specifically, when application 110 requests data from a remote server, there are actually several requests that may be involved. Some of these s may, however, be omitted (for example, if IP addresses corresponding to domain names are cached). The first is "DNS resolution" in which application 110 requests data from a remote server with an associated domain name, but before the request for data can be sent to the remote server, the domain name needs to be "looked up" on a DNS server to identify the IP address of the remote server. The second is the "data fetch" in which, after the IP address of the remote server has been identified by the DNS server, the remote server is communicated with based on its IP address to provide the data that is sought. In some situations, the first request is omitted. Each of these includes two requests: a) application 110 makes a request (which is forwarded to a DNS server in the first request and to the remote server in the second); and b) the server that is being communicated with (a DNS server in the first and the remote server in the second) responds to a request and provides data to application 110. Thus, there are four requests (or two requests if the first two s are omitted) as illustrated in the flow chart diagram included in FIG. 1B: 510: application 110 makes a DNS request to the DNS server; 520: the DNS server returns the IP address of remote server 170 to application 110; 530: the application transmits the data fetch to remote server 170 using IP address obtained in 520; 540: the remote server 170 responds to the data fetch by providing data (or streaming data) to application 110.

In one embodiment, it is during 510 that a determination is made as to whether 520-540 should occur inside or outside of a VPN. Once that determination is made at 510, that decision can be applied to operations 520, 530 and 540. In order to apply that decision at 520, 530 and 540, data is desirably retained so that routing within (or outside of) a VPN can be selected. This process is described below.

As an example, the data that is evaluated by routing module 222 may be a DNS request. Routing module 222 may include a list (a allow list referred to hereafter as the "non-VPN" list) of domain names. Alternatively, a deny list may be used. If the DNS request that routing module 222 receives is to resolve a domain name on the non-VPN list, then routing module 222 makes an initial assumption that the DNS request is being made to request streaming data from a destination that desirably should not go through the VPN. By saying "not go through the VPN," this may mean not going through any VPN. Alternatively, this may mean not going through the VPN that is managed by VPN client 222 and other VPNs may be a feasible option.

More specifically, if the DNS request received by routing module 222 includes a domain name that is on the non-VPN list, the DNS request is transmitted to a DNS server for resolution via a "non-VPN" route. Alternatively, the DNS request may be transmitted via a default route, or via a user-selected route. As an example, in order to transmit the DNS request to a DNS server via a non-VPN route, routing module 222 forwards the DNS request to local proxy 224, then to ISP 135 (via LAN 130 or via an access point such as a cellular connection), and then to Internet 140. Again, note that the DNS request is transmitted outside of the VPN associated with VPN client 220. From Internet 140, the DNS request is forwarded to DNS server 180 as would be known to one of ordinary skill in the art. DNS server 180 resolves the DNS request by identifying an IP address (or multiple IP addresses) associated with the DNS request. After the DNS request is resolved, the identified IP address(es) is returned to VPN client 220.

Before passing the DNS request from routing module 222 to local proxy 224, routing module 222 optionally notes the domain name that was in the DNS request, and notes the IP address that is returned when the DNS request is resolved. Alternatively, both the domain name and the corresponding IP address may be noted when the DNS request is resolved. This information will be used for the routing decision (whether the data fetch should occur inside or outside the VPN) when the subsequent data fetch occurs. This is merely exemplary as in other situations other information may be used or retained instead of or in addition to domain names and/or IP addresses to make routing decisions (i.e., whether the data fetch should occur inside or outside the VPN). Other information includes, for example, SNI extensions and port number. The mechanism for using retained information to route a data transmission inside or outside the VPN is further described below.

The decision of whether to route the DNS request through the VPN can be based on a variety of different factors: the domain name that is being resolved, the IP address of the DNS server, a default route, a user selected route, etc.

In one example, a list of DNS names for services are maintained that should bypass any VPN tunnel. When a DNS name lookup request is received, it is checked if it is one on a maintained list of names that should go around the VPN tunnel and be used with a non-VPN data route, and if so, the DNS request is also sent around the tunnel as well. The purposes are some services only exist on the local network, such as some internal company servers which can only be reached on the company network Wi-Fi. Many services are now hosted in many locations, and a computer doing a DNS lookup will be assigned the closest server. So the request going out the Wi-Fi will receive the closest location to the Wi-Fi, while the request going through the VPN tunnel will receive the server closest to the VPN server.

The role that the DNS is performing provides for when an application is going to access the Internet to access a service, it is typically a two-request process. The application has a domain name for a service it seeks to access, so it first needs to perform the DNS request to get back an IP address, and then it can make the request to that IP address to access the service. So the DNS is mainly an identifier to locate network traffic for data routing. The DNS request is identified and responded to first, and then any future communication to the IP address in the DNS response is known to be associated with that particular service. Without that tracking feature, a request to a particular IP address would not be associated with a particular service. When the requests to those identified IP addresses are identified, the requests can be routed inside or outside of the VPN.

As an example, a default may be for all DNS requests to be routed outside of the VPN. For example, all DNS requests are routed through local proxy 224, and after the DNS request is resolved (and the IP address of the domain name is returned), subsequent data fetches are routed in the VPN or outside of the VPN, depending for example upon the domain name that was resolved. While the domain name (included in the DNS request) may be used to determine whether the subsequent data fetch should occur within or outside of the VPN, this is merely exemplary, as other data may be used to make that determination, such as SNI extensions and port numbers.

VPN client 220 receives the IP address from DNS server 180 in response to the DNS request and, in one embodiment, returns the IP address to application 110 in the manner in which the DNS request was made to DNS server 180. For example, if the DNS request was made via a VPN, then the IP address obtained when resolving the DNS request is delivered to application 110 via a VPN. Conversely, if the DNS request was made outside of a VPN, then the IP address obtained when resolving the DNS request is delivered to application 110 outside of a VPN. A combination of making the DNS request and receiving the IP address over different routes is also contemplated.

To achieve the above objective, IP addresses received from a DNS server are transmitted through Internet 140, ISP 135 (or 136), and an intermediate (e.g., cellular access point, LAN 130, etc.) before reaching VPN client 220. From there, the driver/receiver 241 receives the IP address from DNS server 180 and passes the IP address to application(s) 110. This is further explained below with reference to FIG. 3.

If the DNS request was transmitted via a VPN, then the IP address provided in response may travel along the tunnel used for the DNS request, and the IP address is forwarded to encap/decap module 223 for decapsulation. After being decapsulated, the IP address is delivered to application 110 via driver/receiver 221. Conversely, if the DNS request was transmitted outside of a VPN, then the IP address may be transmitted along the tunnel used for the DNS request to local proxy 224, before delivering the IP address to driver/receiver 221 and application 110 (without performing decapsulation). A driver/receiver 232 may be used for access to a cellular access point in an alternative data routing process.

As explained below, when the DNS request returns an IP address, that IP address is stored in VPN client 220, along with either the domain name that resolved to that IP address, whether further communication with that IP address should (or should not) be over a VPN, both, or other data (i.e. port number). In this manner, when application 110 requests further data (the data fetch) from the IP address returned during DNS resolution, a decision can be made as to whether to forward the further data request or data fetch (and subsequent response) within the VPN or outside the VPN.

Application 110 may be any application that is executing on client 102. Exemplary applications include browsers and applications (or combination thereof).

The present example describes the use of a allow list (with the regard to the non-VPN list). Alternatively, routing decisions can be made based on a deny list of data eliminating domains, IP addresses, and/or other network identifiers and their respective servers.

The operations performed after the DNS request has been resolved are next described.

Application 110 transmits a request to receive data ("further data request" or "data fetch"). In particular, application 110 requests further data from the server at the IP address that was obtained during DNS resolution. The further data request is transmitted to driver/receiver 221, which in turn passes the data request to routing module 222. Routing module 222 then determines over which path to route the further data request (along its way to the IP address obtained during DNS resolution).

The routing of the further data request may depend upon whether the DNS request (the resolution thereof resulting in DNS server 180 providing an IP address to routing module 222) was transmitted to DNS server 180 in a VPN or outside a VPN. Alternatively, the routing of the further data request may be based upon the domain name included in the DNS request (and may be independent of whether the DNS request itself was transmitted in a VPN or outside a VPN).

If the DNS request was for a domain name on the non-VPN list, routing module 222 forwards the further data request (after DNS resolution, and with the IP address obtained during DNS resolution) to local proxy 224. Local proxy 224 then forwards the further data request to remote server 160. Again, this further data request is directed to the IP address that was returned by the DNS server after the DNS request was resolved. The further request may be, for example, for remote server 160 to provide streaming video once it is identified via its domain name, IP address, or a combination of network parameters which were identified during the resolution procedure. Thus, because the DNS request went through local proxy 224 (as opposed to encapsulation module 223), the further data request (or simply data request for streaming data) does not go through the VPN associated with VPN client 220. Instead, the further data request goes to ISP 135 and Internet 140 via local proxy 224, and with the destination IP address that was obtained when the DNS request was resolved. From Internet 140, the further data request is forwarded to remote server 160.

Conversely, if the DNS request was not for a domain name on the non-VPN list (i.e. the request was for a domain name where transmission over a VPN is desired), the further data request is forwarded to encapsulation/decapsulation module 223 before being forwarded to VPN server 250 for decapsulation and further forwarding. The use of the VPN is verified by the known data list(s), such as the known or accepted domain name list, IP address list (i.e., allow lists of accepted addresses/names), or in the reverse an IP address or domain name that was not on a list (i.e., deny lists of not accepted addresses/names). Any combination of accepted or not accepted lists is permissible provided the data is routed in accordance with the rules dictated by the existence of such lists stored in the VPN client memory.

If the routing of the further request is based on whether the DNS request itself was transmitted inside or outside the VPN, that information may be recorded, and the further data request may simply be routed the same way (VPN or non-VPN) as the DNS request.

In some situations, whether to send the further request over the VPN is independent of whether the DNS request (i.e., initial request) was sent over the VPN. Thus, the routing of the further request may be based on the domain name included in the DNS request, the IP address that was provided when the DNS request was resolved, both, or some other data field (e.g. port number). For example, the DNS request may be sent over the VPN and the further data request may be sent over a non-VPN server, or, the DNS request may be sent over the VPN and the further data request may be sent over the VPN, or, the DNS request may be sent over the non-VPN server and the further data request may be sent over the VPN server, or, the DNS request may be sent over the non-VPN and the further data request may be sent over a non-VPN server.

Returning to the situation in which the further data request is for application 110 to be provided with requested data outside of the VPN, remote server 160 desirably includes the data that is requested by application 110. In an exemplary embodiment of the present invention, the requested data is streaming data. In a further exemplary embodiment of the present invention, the requested data is video streaming data from a video streaming provider such as NETFLIX, HULU, etc.

Many video streaming providers do not wish to communicate with a client over a VPN for reasons previously explained. Since, in accordance with an exemplary embodiment of the present invention, remote server 160 was contacted outside of a VPN, remote server 160 desirably responds to the request from application 110 with requested video streaming data (assuming there is a valid account, and other requirements of the commercial video streaming servers have been met). Remote server 160 transmits the streaming data through Internet 140, to local proxy 224, through driver/receiver 221, and back to application 110.

Alternatively, application 110 transmits data that a user wishes to have transmitted, and/or receives data that a user wishes to receive, through the VPN. Accordingly, the data request from application 110 is received by driver 221 and is then passed to routing module 222. As routing module 222 evaluates the DNS request, but does not see in that request a domain name on the non-VPN list (or sees in that request a domain name on a VPN list), routing module 222 passes the request to the VPN that is managed by VPN client 220. The DNS request may be intercepted, examined by the VPN client for domain name and/or IP address information and/or other network parameter data and then a decision can be made as to whether to route the request or cancel the request, route the request and block subsequent data transfers or other operations. The data transmission is transferred from routing module 222 to encap/decap module 223. As the data is now encapsulated (and possibly encrypted), encapsulated data is transmitted to VPN server 250 via Internet 140 (and appropriate intermediate points). At VPN server 250, the data is decapsulated (which may also include decryption) via decap/encap module 252 and forwarded via Internet 140 to the destination server (i.e. remote server 170). Remote server 170 responds to the request by transmitting the response with the requested data via Internet 140 to VPN server 250. The data enters decap/encap module 252 where it is encapsulated. VPN server 250 encapsulates the data and transmits the data to encap/decap module 223 via Internet 140. Encap/decap module 223 decapsulates the data, and transmits the decapsulated data to receiver 221, and then to application 110 from which the original request for the response originated.

Figure 1A:
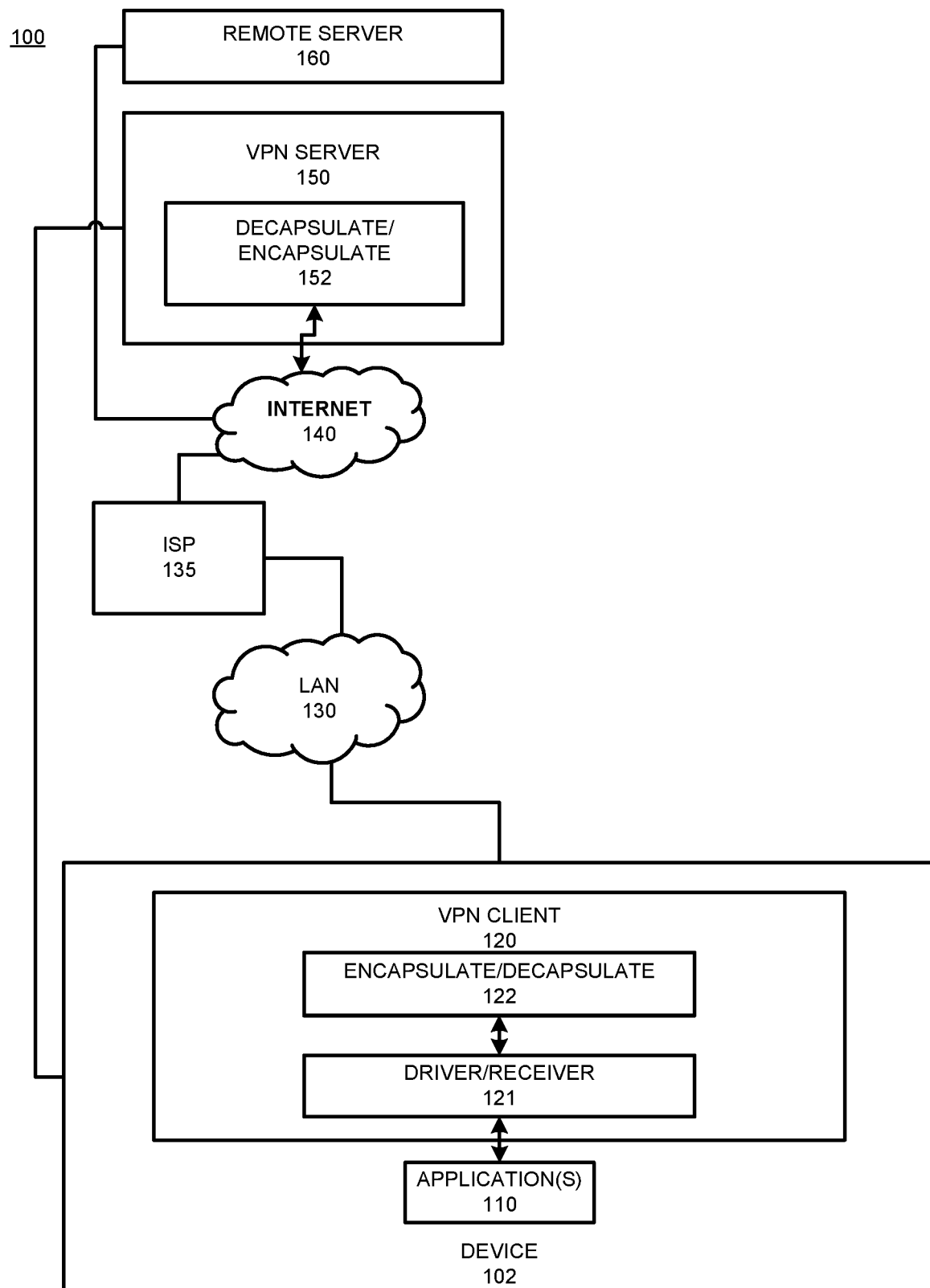
FIG. 1A is a block diagram that illustrates a VPN in accordance with the prior art.
Figure 1B:
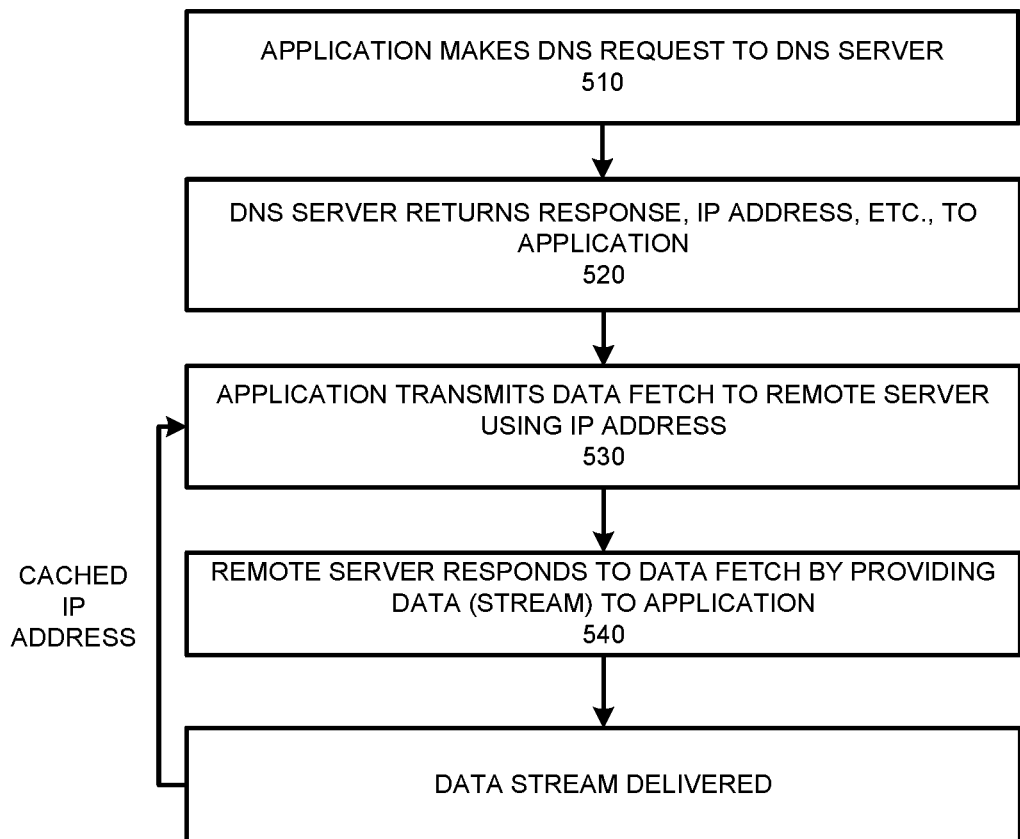
FIG. 1B is a flowchart diagram that illustrates communication with a remote server in accordance with example embodiments.
Figure 3:
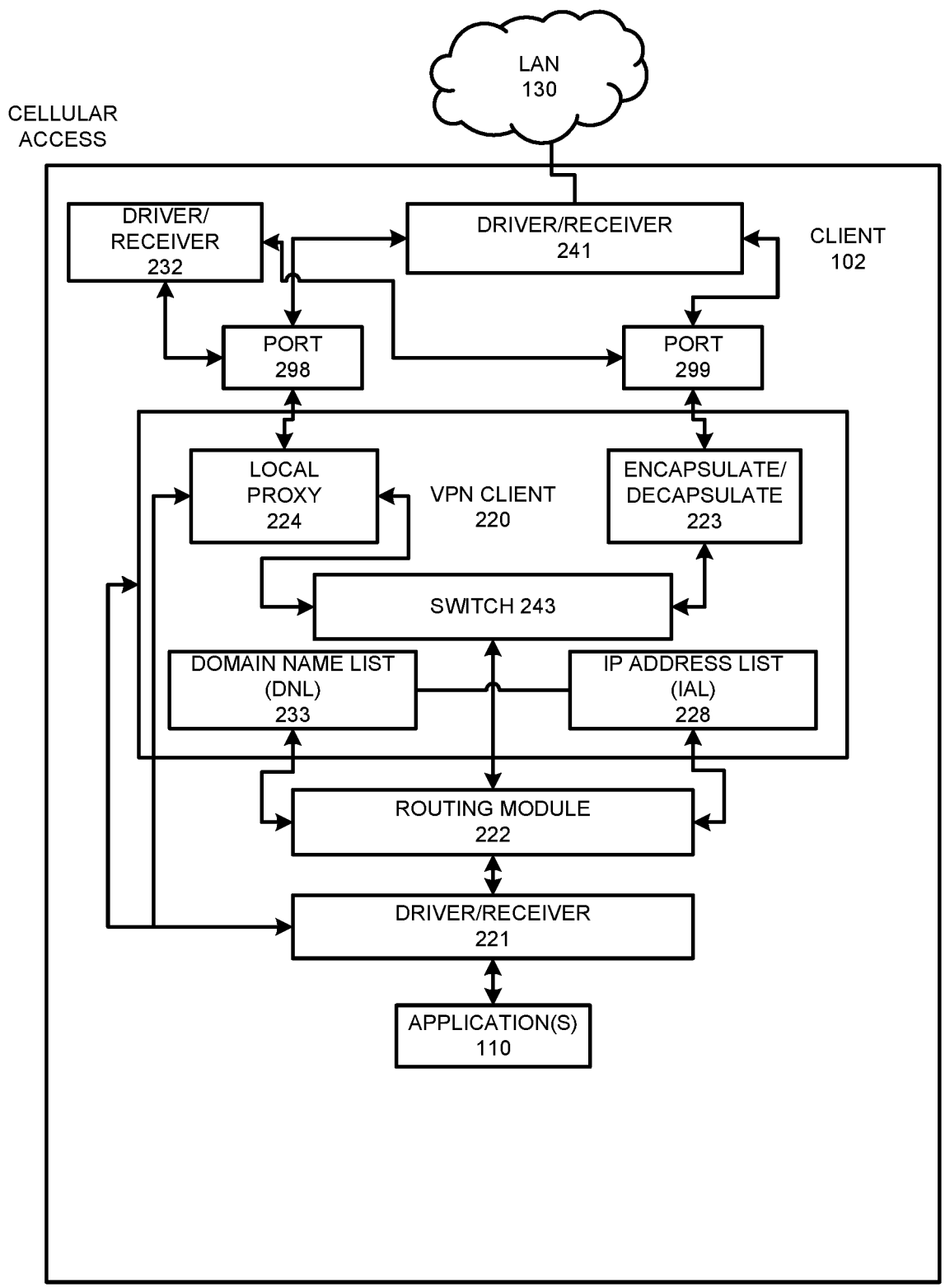
FIG. 3 is a block diagram that illustrates an exemplary VPN client in accordance with example embodiments.

FIG. 3 is a block diagram that provides exemplary details regarding VPN client 220 illustrated in FIG. 2. FIG. 3 also illustrates in one embodiment how information obtained earlier, as illustrated in FIG. 1B, may be used to direct data later in FIG. 1B.

Once driver/receiver 221 receives a data request from application 110 (not shown in FIG. 3), the data request is passed to routing module 222 so that a determination can be made as to whether the data request should be transmitted within a VPN or outside of a VPN. Routing module makes this determination in any number of ways, but one method is to compare the domain name associated with the data request with a list of domain names in domain name list 228. Based on a deny list or not permitted names or an allow list or accepted names, the data request may or may not be transmitted via the VPN.

Assume that the data request is to receive streaming video. The domain name of the data request is optionally noted and the data request is forwarded to local proxy 224 or encap/decap 223 (as explained above). Alternatively, the domain name is noted when the domain name and corresponding IP address are returned to application 110 following DNS resolution. The data request is then forwarded to driver 241 and to LAN 130 (also shown in FIG. 2) or to driver 242 and a cellular access point 232 (for example) along a particular tunnel (identified with a port number).

The response to the data request is received by driver 241 (or driver 242) along the same tunnel over which the data request was sent. If the request was sent over local proxy 224, the response will be returned to local proxy 224 over the same tunnel it was sent. If the request was sent over encap/decap 223, the response will be returned to encap/decap 223 over the same tunnel it was sent. From either local proxy 224 or encap/decap 223, the response is returned to application 110.

When the IP address is returned to local proxy 224 or encap/decap 223, in one embodiment the IP address is subsequently stored in IP address list (IAL) 228 as an update to already known IP addresses, and the IP address is then matched up with the domain name that was in the DNS request. As DNL 233 previously had a list of domain names of websites that should not be communicated with through the VPN (after each domain name is resolved into an IP address), and IAL 228 has a list of IP addresses that correspond to each domain name, it is now possible to determine whether a transmission to an IP address should go through a VPN. In this manner, when application 110 responds to receipt of the IP address (following DNS resolution) by requesting data (e.g. streaming video data from remote server 160 or other data from remote server 170) this "data fetch" may be routed either in or out of the VPN (based on whether communication with the website should occur within the VPN) by routing module 222 accessing IAL 228 to identify the existence of a known/unknown IP address and whether such data is deny listed or allow listed.

For example, if IAL 228 has stored therein that a data fetch to an IP address (based on the IP address corresponding to a domain name that should be in the VPN as indicated by the list(s)) should be in the VPN, the data fetch is routed by routing module 222 to encap/decap 223 (and the data fetch is directed on an intermediate basis to VPN server 250). IF IAL 228 has stored therein that a data fetch to an IP address (based on the IP address corresponding to a domain name that should be out of the VPN) should be out the VPN, the data fetch is routed by routing module 222 to local proxy 224.

As an alternative, routing of a data fetch may be directed to the same port as the DNS request (if the port is retained).

As an alternative, the routing of the DNS request bears no relationship to the routing of the data fetch. When the IP address is returned following DNS resolution, the IP address is matched up with the domain name on which the DNS request was based. The domain name was previously identified (based on the non-VPN list) as being the predecessor of a data fetch either in the VPN or outside of the VPN.

In another embodiment, certain applications may be known to use certain ports, and VPN client 220 may have stored therein that use of certain ports should or should not be over the VPN. Thus, if use of a port is detected for which this information is known, a data fetch for an application can be routed within or outside a VPN based on the port number being used as a primary or secondary type of network identifier when deciding whether to route the data through the VPN.

To summarize, in one embodiment, whether each illustrated in FIG. 1B is performed inside a VPN or outside a VPN is determined based on data stored in IP address list (IAL) 228 and/or Domain names list (DNL) 233. In 510 when the DNS request is transmitted to DNS server 180, the domain name in the DNS request is compared to the non-VPN list of domain names stored in DNL 227 to determine if the DNS request is for a server on the non-VPN list. This may also be deferred until later. The DNS request is then routed inside or outside of the VPN depending upon default, user preference, or some other basis. When the DNS request is responded to by DNS server 180, the response is identified as a response to 510 (by comparing the header of the response with the header of the DNS request), and the IP address that is provided in the response is registered in IAL 228 as being associated with the domain name in the DNS request. The response in 520 is routed along the same path as 510 (because 510 and 520 are performed on the same socket). When 530 is performed, the IP address in the data fetch is compared to the IP addresses in IAL 228. If there is a match then 530 is performed with appropriate routing (i.e., if transmission to the server associated with the domain name is to be performed via VPN, then 530 is performed via VPN; if transmission to the server associated with the domain name is not to be performed via VPN, then 530 is performed outside of the VPN. Also, when remote server 160 responds in 540, the response is routed the same way (within the VPN or outside of the VPN) as was performed in 530 (because 530 and 540 are performed on the same socket).

Furthermore, in one embodiment, the routing of data performed with respect to 510 and 520 has no bearing on 530 and 540. Operations 510, 520 may be performed on one socket and 530, 540 may be performed on another socket. Operations 510 and 520 (being a DNS request) may be performed on a default route, or a route chosen by the user or a route based on a selection logic according to the known data routing options. At 510 the domain name of the DNS request is recorded (or noted that it is in) DNL 233. At 520 the IP address is recorded in IAL 228. Based on the recorded information, 530 is routed based on a) the comparison of the domain name of the DNS request with the non-VPN list; b) associating the IP address returned after DNS resolution with the domain name in the DNS request; c) identifying the IP address returned after DNS resolution in the data fetch.

Figure 4:
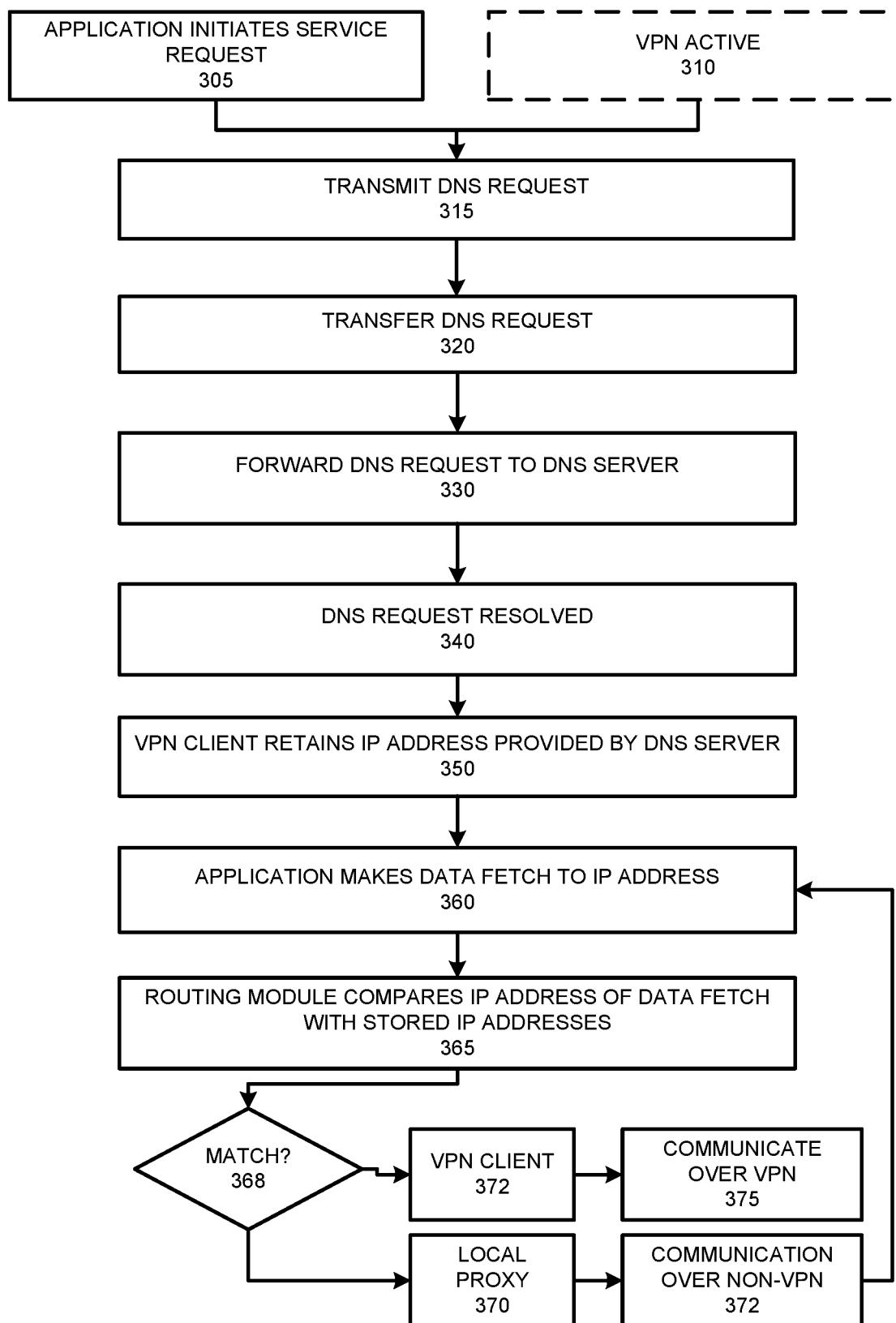
FIG. 4 is a flowchart diagram that illustrates operation of a VPN in accordance with an exemplary embodiment of the present invention.

FIG. 4 is a flowchart diagram that illustrates a method in accordance with an exemplary embodiment of the present invention.

At 305, application 110 is instructed and/or begins to initiate a service request. The service request may be a request for data to be returned to application 110 from the destination of the service request. The service request may be, for example, for application 110 to be provided with streaming video. Alternatively, or concurrently, the service request may be, for example, for application 110 to communicate over the Internet and with a server via a VPN. As a further alternative, at 305, application 110 simply transmits data.

At 310, an active VPN exists between VPN client 220 and VPN server 250. Operation 310 may occur before 305, after 305, and/or concurrently with 305.

At 315, in order to proceed with the service request initiated at 305, application 110 proceeds to request a response from a resource that is coupled to the Internet, and a DNS request is transmitted. The response from the resource can be, for example, streaming video. The response from the resource can be, for example, voice communication (i.e., bidirectional data transfer) with encryption via a VPN. Therefore, application 110 transmits a DNS request (to resolve a domain name) so that an IP address of the server associated with the domain name can be returned to application 110.

In some embodiments, 315 is optional, if application 110 already has the IP address of the server it wishes to communicate with. This may occur, for example, if the IP address has been cached or identified through a different method.

At 320, the DNS request is transferred to DNS server 180 by traveling outside of VPN client 220, via routing module 222 within VPN client 220, or some other path. Routing module 222 may optionally note the domain name associated with the DNS request. This is optional if 315 did not need to be performed.

At optional operation 330, the DNS request is forwarded to DNS server 180 via Internet 140. The DNS request may be forwarded inside the VPN or outside the VPN depending upon a number of factors: 1) DNS requests for some domain names may be routed in the VPN and/or DNS requests for other domain names may be routed outside of the VPN; 2) DNS requests are automatically sent inside or outside the VPN; 3) the user decides whether DNS requests are routed inside or outside the VPN.

At optional operation 340, the DNS request is resolved. The DNS request is resolved by providing an IP address or some other identifying data. Thus, after the DNS request is transmitted to Internet 140, the DNS request is received by DNS server 180. DNS server 180 resolves the request and provides an IP address or other data to driver/receiver 241 along the same socket that the DNS request was made.

At optional operation 350, the IP address provided in 340 is retained in VPN client 220, along with the domain name corresponding to that IP address. The IP address, the domain name, and the fact that the two are related, may be obtained from the DNS response resource record. In particular, the name resource field and the RDATA resource field include the domain name and corresponding IP address, respectively.

At 360, application 110 makes a data request ("data fetch") or just transmits data using the IP address that was obtained in 350 (or that may be obtained from another source, such as a cache). The data fetch is transmitted from application 110 to VPN client 220.

At 365, routing module 222 compares the IP address in the data fetch with the IP addresses it has collected in 350 (or retained in a cache). To perform this, routing module 222 may communicate with DNL 233 (which may be communicating with IAL 228).

At 368, certain actions are taken depending upon whether the IP address comparison indicates corresponding domain name requests should or should not be transmitted over the VPN.

At 370, if the IP address in the data fetch matches an IP address collected in 350, and that IP address corresponds to a domain name of a server for which communication is performed outside of the VPN, then the data fetch (or data transmission) is transferred to local proxy 224. Otherwise, at 372, the data fetch (or data transmission) is transferred to encap/decap 223 (alternatively routing module 222 looks for IP addresses for communication that should be performed inside the VPN).

At 372, a data fetch/transmission transferred to local proxy 224 reaches server 160 without going through a VPN. The response from server 160 (if any) is transmitted along the same socket that was used to reach server 160. The response flows through local proxy 224, driver/receiver 221 and application 110.

At 375, a data fetch transferred to encap/decap 223 reaches server 170 after going through VPN server 250. The response from server 170 (if any) flows through VPN server 250, and is then transmitted along the same socket that was used to reach VPN server 250. The response flows through encap/decap 223, driver/receiver 221 and to application 110.

The above explanation has described 510, 520, 530 and 540, but various routings for these operations may be performed. For example, 510 and 520 can be performed with the same routing, 530 and 540 can be performed with the same routing, but the routing for 510 and 520 may be different than the routing performed for 530 and 540. In one example, 510 and 520 are performed on one socket, and 530 and 540 are performed on another socket. Other combinations are also contemplated.

In one embodiment of the present invention, all communication is defaulted to the VPN. In another embodiment of the present invention, some communication (i.e., a data fetch) is defaulted to the VPN. In one embodiment, a VPN is defaulted to when certain applications are active. In one embodiment, if a VPN has been in use (or is expected to be in use), when routing module 222 routes a transmission outside of the VPN, the user device or client device is informed that this will occur or this is occurring. In some embodiments, the user device is simply informed. In other embodiments, the user device is prompted to give permission to route a transmission outside of the VPN before the transmission outside of the VPN occurs. In some embodiments, a switch is available to the user device so that the user can select different options, such as no data is transmitted outside of the VPN, all data is transmitted outside of the VPN, ask the user before transmitting data outside of the VPN, tell the user device when data is being transmitted outside of the VPN, etc.

As explained above, a cache (or multiple caches) may be used to store IP addresses received in response to DNS requests. In this manner, once an IP address has been obtained for a domain name, subsequent data fetches for the server associated with that domain name may dispense with the need to issue a DNS request. This is because, if cached, the IP address associated with a domain name can be obtained from the client cache (or some other cache) without going to the DNS server for that information.

In one exemplary embodiment, a separate cache of IP addresses is maintained for each domain name. This may be advantageous when, for example, streaming is occurring for a long period of time. If all IP addresses for all domain names are maintained in one cache, and streaming is occurring for a long period of time, and as multiple websites are accessed, the IP address of the domain name associated with the streaming server may fall out of the cache. Thus, when an IP address is associated with a domain name of a streaming server, that IP address may be maintained in a separate cache (and for each streaming server accessed, a separate cache may be maintained). A server may be identified as a "streaming server" because certain domain names are known to be streaming servers. Another way of identifying a server as a streaming server may be to observe that the server is streaming for long periods of time.

In a further embodiment, the non-VPN list of domain names is associated with multiple IP addresses, i.e., each domain name is associated with a plurality of IP addresses that may be used to access data from the server(s) associated with the respective domain name.

In a further embodiment, the decision regarding whether to route a transmission over a VPN may be based on criteria other than the IP address used in the data fetch. For example, certain application(s) are known to use predetermined port numbers. If a data fetch is initiated from such an application, when VPN client 220 sees a certain port number being accessed, or some other identifying information, VPN client automatically channels the data fetch over a VPN, our outside of a VPN (depending upon instructions prestored in the VPN).

The Domain Name List and the IP Address List are shown in the figures as separate lists, with separate input connections, and a connection therebetween, but this is merely exemplary. The two Lists may be combined into a single list. The "non-VPN list" described above may be incorporated into either list, the combined list, or maintained separately to route data transmissions in a VPN, or outside of a VPN based on data collected while application 110 is transmitting and/or receiving data.

An advantage of the above features is that a video streaming provider will provide streaming video to a requesting client, and will not refuse to provide streaming video because the request for a remote server to begin streaming was received via a VPN.

The above explanations have referred to "encryption," but it is understood that encryption is only one aspect of the present invention. Thus, where "encryption" is described, the present invention may relate to encapsulation with or without encryption. Similarly, where "decryption" is described, the present invention may relate to decapsulation with or without decryption. For example, while a carrier layer is described above, data that is transported on the carrier layer may be encapsulated and subsequently decapsulated. All references to protocol set forth above may relate to data that is subject to encapsulation (with or without encryption), with the understanding that all references to encryption above may alternatively relate to encapsulation.

Figure 5:
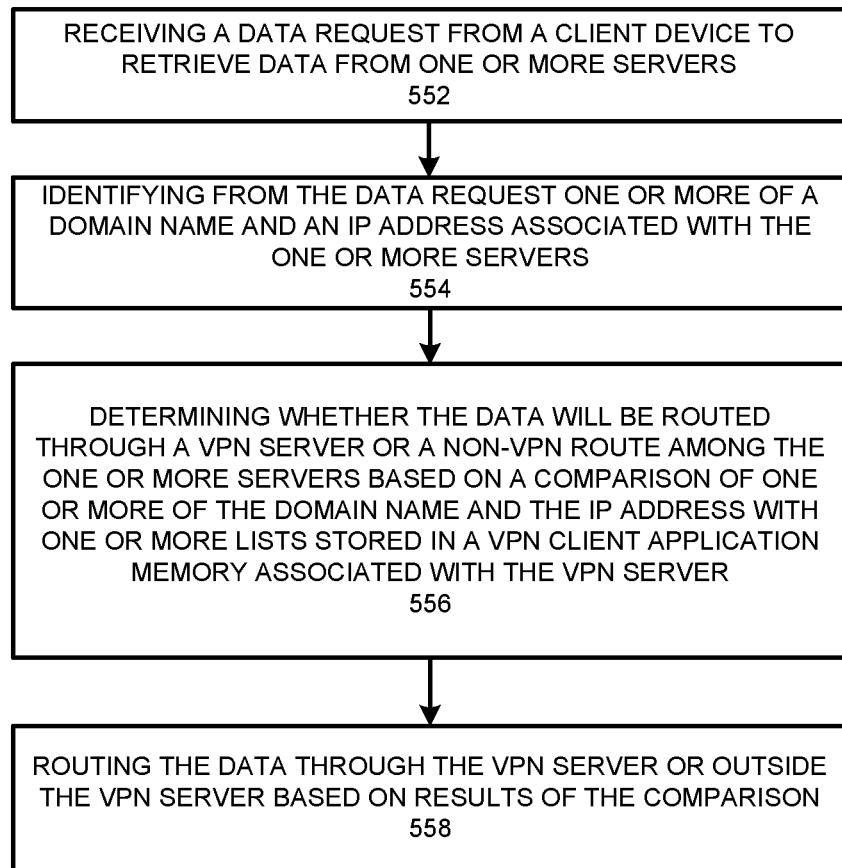
FIG. 5 is a flowchart of an example process according to example embodiments.

FIG. 5 illustrates an example process for performing data routing according to example embodiments. Referring to FIG. 5, the process includes receiving a data request from a client device to retrieve data from one or more servers 552, identifying from the data request one or more of a domain name and an IP address associated with the one or more servers 554, determining whether the data will be routed through a VPN server or a non-VPN route among the one or more servers based on a comparison of one or more of the domain name and the IP address with one or more lists stored in a VPN client application memory associated with the VPN server 556, and routing the data through the VPN server or outside the VPN server based on results of the comparison 558. The non-VPN route may be any data network route that does not specifically use the VPN server.

The process may also include forwarding a DNS request to a DNS server to resolve the DNS request with the IP address and a corresponding domain name, and receiving, via the VPN client, the IP address and the domain name, and storing the IP address, the domain name corresponding to the IP address, and VPN or non-VPN data routing designation, indicating whether to route the data through the VPN server or outside the VPN server, in the VPN client application memory. The client device may be assigned a data route that includes or precludes the VPN server. The one or more lists may include one or more of an IP address deny list blocking IP address list blocking certain IP addresses from using the VPN server to route the data, and an IP address allow list permitting certain IP addresses to use the VPN server to route the data. As a result, the lists may dictate which route to use based on the IP addresses obtained for the data communication to and from the client device. The one or more lists include one or more of a domain name deny list blocking certain domain names from using the VPN server to route the data and a domain name allow list permitting certain domain names to use the VPN server to route the data. The process may also include determining whether the DNS request was routed via the VPN server or via the non-VPN route, and when the DNS request was routed via the non-VPN route, forwarding the IP address, via the non-VPN route, and routing future requests associated with the client device identifying the IP address via the non-VPN route.

Alternatively, the process may include determining whether the DNS request was routed via the VPN server or via a non-VPN server route, and when the DNS request was routed by the VPN server, forwarding the IP address, via the VPN server, to an application associated with the client device, and routing future requests associated with the client device identifying the IP address via the VPN server. The data request may be initiated from a client device application seeking streaming media content data.

The above explanation has been with regard to a client computer initiating communication with a server, but this is merely exemplary. In a further exemplary embodiment of the present invention, the server may initiate communication with the client computer. In such an exemplary embodiment, the communication from the server to the client computer may include multiple attempts to communicate and with one or more of the variations (e.g. network access, protocol, etc.) described above.

The drawings included herein show a DNS server. It is understood that none, one, changing, or multiple DNS servers may be included in any of the disclosed embodiments.

The drawings show that servers may be separated. Multiple servers described herein may be implemented as a single server.

The above explanation describes communication between client 102 and one or more servers over a LAN. The communication may be over other intermediary systems, such as a cellular network.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Figure 6:
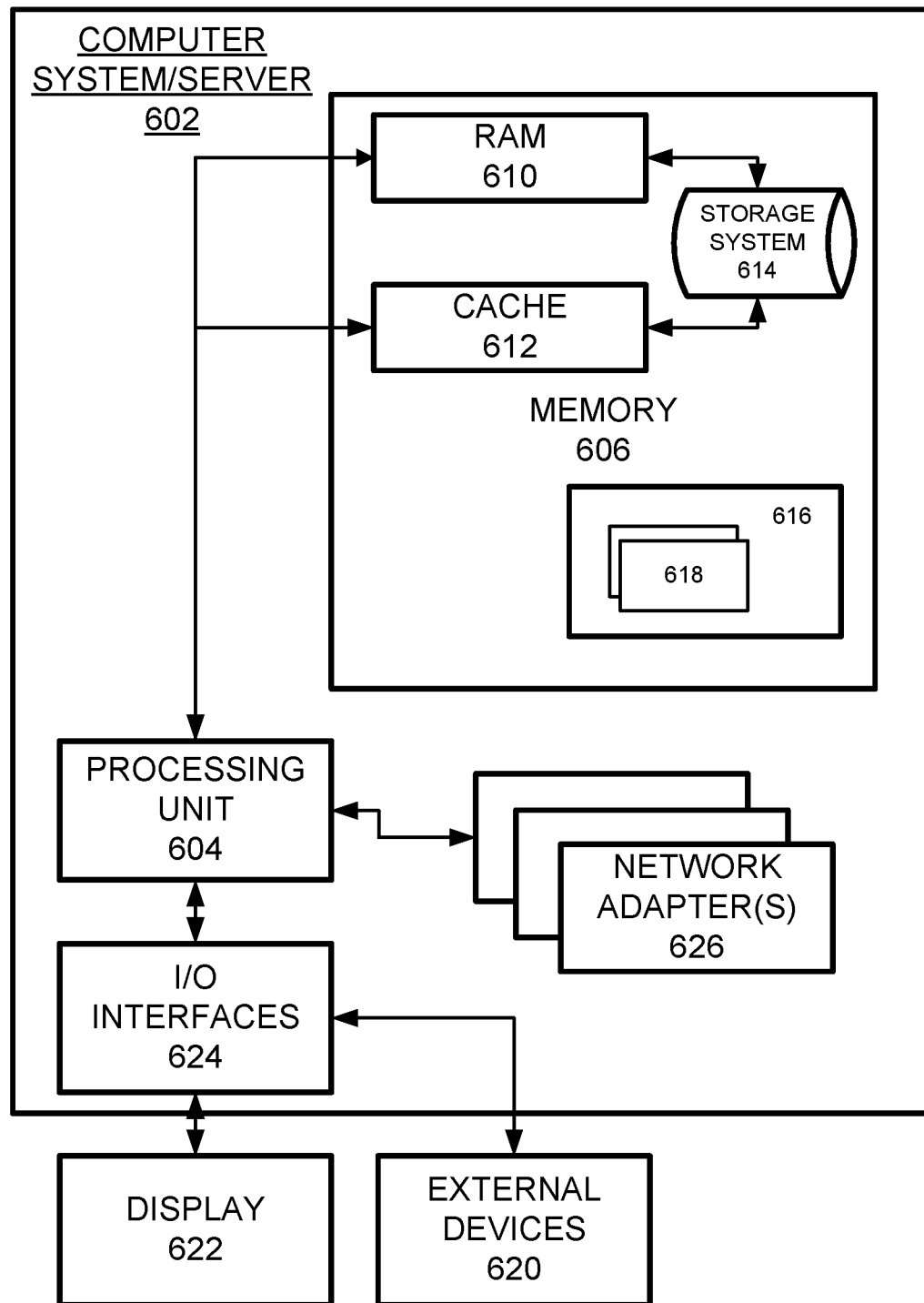
FIG. 6 is a computer system configuration configured to perform one or more of the example processes according to example embodiments.

FIG. 6 is a computer system configuration configured to perform one or more of the example processes according to example embodiments.

FIG. 6 illustrates an example network entity device configured to store instructions, software, and corresponding hardware for executing the same according to example embodiments. FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 6, computer system/server 602 in cloud computing node 600 is displayed in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter(s) 626. As depicted, network adapter(s) 626 communicates with the other components of computer system/server 602 via a bus. It should be understood that although not displayed, other hardware and/or software components could be used in conjunction with computer system/server 602. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto. Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to an apparatus for performing the operations herein. This apparatus may be specially constructed for the required purposes or it may comprise a general-purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, flash memory devices including universal serial bus (USB) storage devices (e.g., USB key devices) or any type of media suitable for storing electronic instructions, each of which may be coupled to a computer system bus.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising
determining whether a data request initiated by a client device to obtain data from a remote server should be forwarded by a virtual private network (VPN) server or outside of the VPN server by identifying a domain name of the remote server included in a domain name system (DNS) request associated with the data request and by determining the domain name is on a list, identifying servers requiring non-VPN communications, stored in a routing module of the client device;

forwarding, via the client device, a data fetch outside of the virtual private network (VPN) server in communication with the client device, to obtain the data from the remote server;

receiving the data from the remote server, via the client device, outside of the VPN server;

forwarding, via the client device, a request for additional data to the VPN server; and receiving the additional data from the VPN server at the client device.

2. The method of claim 1, comprising storing an IP address and a VPN or non-VPN server data routing designation, indicating whether to route the data through the VPN server or outside the VPN server, in a VPN client application memory of the client device.

3. The method of claim 1, comprising wherein the list comprises one or more of an IP address deny list blocking certain IP addresses from using the VPN server to route the data and an IP address allow list permitting certain IP addresses to use the VPN server to route the data.

4. The method of claim 1, comprising wherein the list comprises one or more of a domain name deny list blocking certain domain names from using the VPN server to route the data and a domain name allow list permitting certain domain names to use the VPN server to route the data.

5. The method of claim 2, comprising responsive to the DNS request being routed via the non-VPN server route, forwarding the IP address, via the non-VPN server route.

6. The method of claim 5, comprising routing future requests associated with the client device identifying the IP address via the non-VPN server route.

7. The method of claim 1, wherein the data request is initiated from a client device application seeking streaming media content data.

8. A client device comprising a processor configured to determine whether a data request initiated by the client device to obtain data from a remote server should be forwarded by a virtual private network (VPN) server or outside of the VPN server by identifying a domain name of the remote server included in a domain name system (DNS) request associated with the data request and by determining the domain name is on a list, identifying servers requiring non-VPN communications, stored in a routing module of the client device;

a transmitter configured to forward a data fetch outside of the virtual private network (VPN) server in communication with the client device, to obtain the data from the remote server;

a receiver configured to receive the data from the remote server, via the client device, outside of the VPN server;

wherein the transmitter is further configured forward a request for additional data to the VPN server; and wherein the receiver is further configured to receive the additional data provided by the VPN server to the client device.

9. The client device of claim 8, wherein the processor is further configured to store an IP address and a VPN or non-VPN server data routing designation, indicating whether to route the data through the VPN server or outside the VPN server, in a VPN client application memory of the client device.

10. The client device of claim 8, wherein the list comprises one or more of an IP address deny list blocking certain IP addresses from using the VPN server to route the data and an IP address allow list permitting certain IP addresses to use the VPN server to route the data.

11. The client device of claim 8, wherein the list comprises one or more of a domain name deny list blocking certain domain names from using the VPN server to route the data and a domain name allow list permitting certain domain names to use the VPN server to route the data.

12. The client device of claim 9, wherein the processor is further configured to responsive to the DNS request being routed via the non-VPN server route, forward the IP address, via the non-VPN server route.

13. The client device of claim 9, wherein the processor is further configured to route future requests associated with the client device identifying the IP address via the non-VPN server route.

14. The client device of claim 8, wherein the data request is initiated from a client device application seeking streaming media content data.

15. A non-transitory computer readable storage medium comprising instructions that when executed cause a processor to perform:

determining whether a data request initiated by a client device to obtain data from a remote server should be forwarded by a virtual private network (VPN) server or outside of the VPN server by identifying a domain name of the remote server included in a domain name system (DNS) request associated with the data request and by determining the domain name is on a list, identifying servers requiring non-VPN communications, stored in a routing module of the client device;

forwarding, via the client device, a data fetch outside of the virtual private network (VPN) server in communication with the client device, to obtain the data from the remote server;

receiving the data from the remote server, via the client device, outside of the VPN server;

forwarding, via the client device, a request for additional data to the VPN server; and receiving the additional data from the VPN server at the client device.

16. The non-transitory computer readable storage medium of claim 15, wherein the processor is further configured to perform:

storing an IP address and a VPN or non-VPN server data routing designation, indicating whether to route the data through the VPN server or outside the VPN server, in a VPN client application memory of the client device.

17. The non-transitory computer readable storage medium of claim 15, wherein the processor is further configured to perform:

wherein the list comprises one or more of an IP address deny list blocking certain IP addresses from using the VPN server to route the data and an IP address allow list permitting certain IP addresses to use the VPN server to route the data.

18. The non-transitory computer readable storage medium of claim 15, wherein the processor is further configured to perform:
    wherein the list comprises one or more of a domain name deny list blocking certain domain names from using the VPN server to route the data and a domain name allow list permitting certain domain names to use the VPN server to route the data.

19. The non-transitory computer readable storage medium of claim 16, wherein the processor is further configured to perform:
    responsive to the DNS request being routed via the non-VPN server route, forwarding the IP address, via the non-VPN server route.

20. The non-transitory computer readable storage medium of claim 19, wherein the processor is further configured to perform:
    routing future requests associated with the client device identifying the IP address via the non-VPN server route.

* * * * *